US012689627B1

(12) United States Patent
Gupta et al.

(10) Patent No.: US 12,689,627 B1
(45) Date of Patent: Jul. 21, 2026

(54) SECURE NETWORK CONNECTIONS TO ON-PREMISES NETWORKS IN SERVERLESS APPLICATIONS

(71) Applicant: Amazon Technologies, Inc., Seattle, WA (US)

(72) Inventors: Kshitij Gupta, Seattle, WA (US); Prashant Kumar Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/899,543

(22) Filed: Sep. 27, 2024

(51) Int. Cl.
*H04L 29/06* (2006.01)
*H04L 9/40* (2022.01)
(52) U.S. Cl.
CPC .................................. *H04L 63/101* (2013.01)
(58) Field of Classification Search
CPC ......... H04L 63/10; H04L 63/20; H04L 63/14; H04L 63/0281; H04L 63/101; H04L 63/0263
See application file for complete search history.

(56) References Cited

U.S. PATENT DOCUMENTS

| | | | | |
|---|---|---|---|---|
| 8,595,378 | B1 * | 11/2013 | Cohn ...................... | G06F 9/455 |
| | | | | 709/239 |
| 2022/0239627 | A1 * | 7/2022 | Devireddy .......... | G06F 9/45558 |
| 2023/0409412 | A1 * | 12/2023 | Kruegel .................. | G06F 9/541 |
| 2025/0077214 | A1 * | 3/2025 | Banaal ...................... | G06F 8/65 |

OTHER PUBLICATIONS

Amazon, "AWS Direct Connect + AWS Site-to-Site VPN," retrieved on Sep. 26, 2024 from URL: https://docs.aws.amazon.com/whitepapers/latest/aws-vpc-connectivity-options/aws-direct-connect-site-to-site-vpn.html, in 2 pages.
Amazon, "AWS Direct Connect," retrieve on Sep. 26, 2024 from URL: https://aws.amazon.com/directconnect/, in 7 pages.
Amazon, "AWS VPN," retrieved on Sep. 16, 2024 from URL: https://aws.amazon.com/vpn/, in 5 pages.
Amazon, "AWS Identity and Access Management," retrieved on Sep. 26, 2024 from URL: https://aws.amazon.com/iam/, in 7 pages.

* cited by examiner

*Primary Examiner* — Longbit Chai
(74) *Attorney, Agent, or Firm* — Knobbe, Martens, Olson & Bear, LLP

(57) ABSTRACT

Systems and methods are described for providing a secure network connection between a serverless instance and an external environment with respect to a serverless execution environment hosting the serverless instance. A secure connection management system may be implemented in a serverless execution environment with at least one host device hosting the one or more function execution environments. The secure connection management system may facilitate establishment and management of a secure network connection between the serverless instance and the external environment in accordance with the connection configuration. The secure connection management system may also be isolated from the function execution environments in a separate execution environment such that the secure connection management system may take action to reduce risk to the external environment against issues with the execution of serverless function code on the serverless instance.

20 Claims, 7 Drawing Sheets

500

BASED ON A RECEIVED CONNECTION CONFIGURATION, ESTABLISH A CONNECTION BETWEEN A VM INSTANCE AND AN ON-PREMISES ENVIRONMENT, WHERE THE CONNECTION IS ESTABLISHED SUCH THAT COMMUNICATIONS THROUGH THE CONNECTION ARE ISOLATED FROM CODE EXECUTION ON THE VM INSTANCE — 502

OBTAINING A COMMUNICATION FROM THE VM INSTANCE — 504

DETERMINING A ROUTING OF THAT COMMUNICATION TO THE ON-PREMISES ENVIRONMENT — 506

ROUTING THE COMMUNICATION TO THE ON-PREMISES ENVIRONMENT — 508

SECURELY RELAY A RESPONSE FROM THE ON-PREMISES ENVIRONMENT TO THE VM INSTANCE — 510

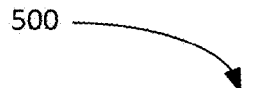

500

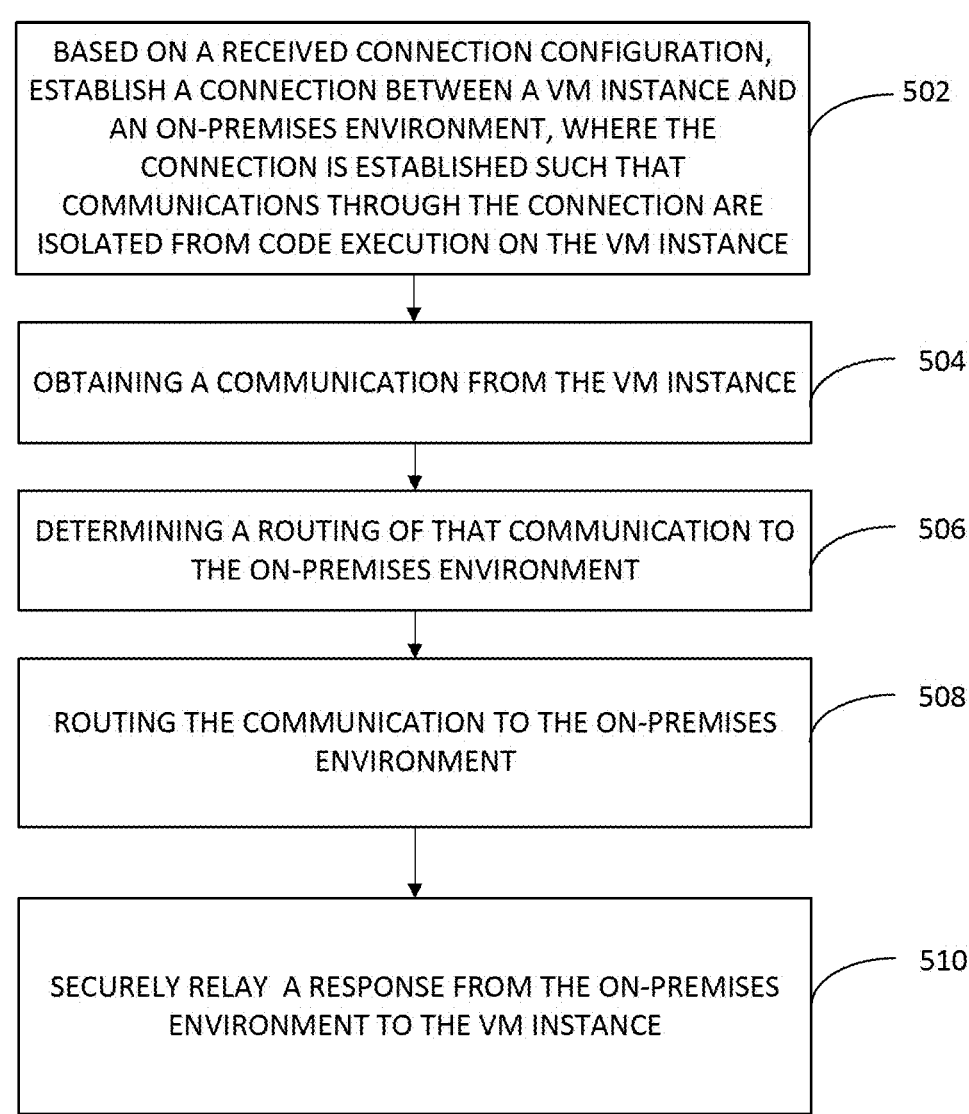

BASED ON A RECEIVED CONNECTION CONFIGURATION, ESTABLISH A CONNECTION BETWEEN A VM INSTANCE AND AN ON-PREMISES ENVIRONMENT, WHERE THE CONNECTION IS ESTABLISHED SUCH THAT COMMUNICATIONS THROUGH THE CONNECTION ARE ISOLATED FROM CODE EXECUTION ON THE VM INSTANCE — 502

OBTAINING A COMMUNICATION FROM THE VM INSTANCE — 504

DETERMINING A ROUTING OF THAT COMMUNICATION TO THE ON-PREMISES ENVIRONMENT — 506

ROUTING THE COMMUNICATION TO THE ON-PREMISES ENVIRONMENT — 508

SECURELY RELAY A RESPONSE FROM THE ON-PREMISES ENVIRONMENT TO THE VM INSTANCE — 510

*FIG. 5*

SECURE NETWORK CONNECTIONS TO ON-PREMISES NETWORKS IN SERVERLESS APPLICATIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

BRIEF DESCRIPTION OF DRAWINGS

FIG. 5 depicts an example method for secure network connection between serverless functions implemented on a VM instance and an on-premises environment.

DETAILED DESCRIPTION

Figure 1:
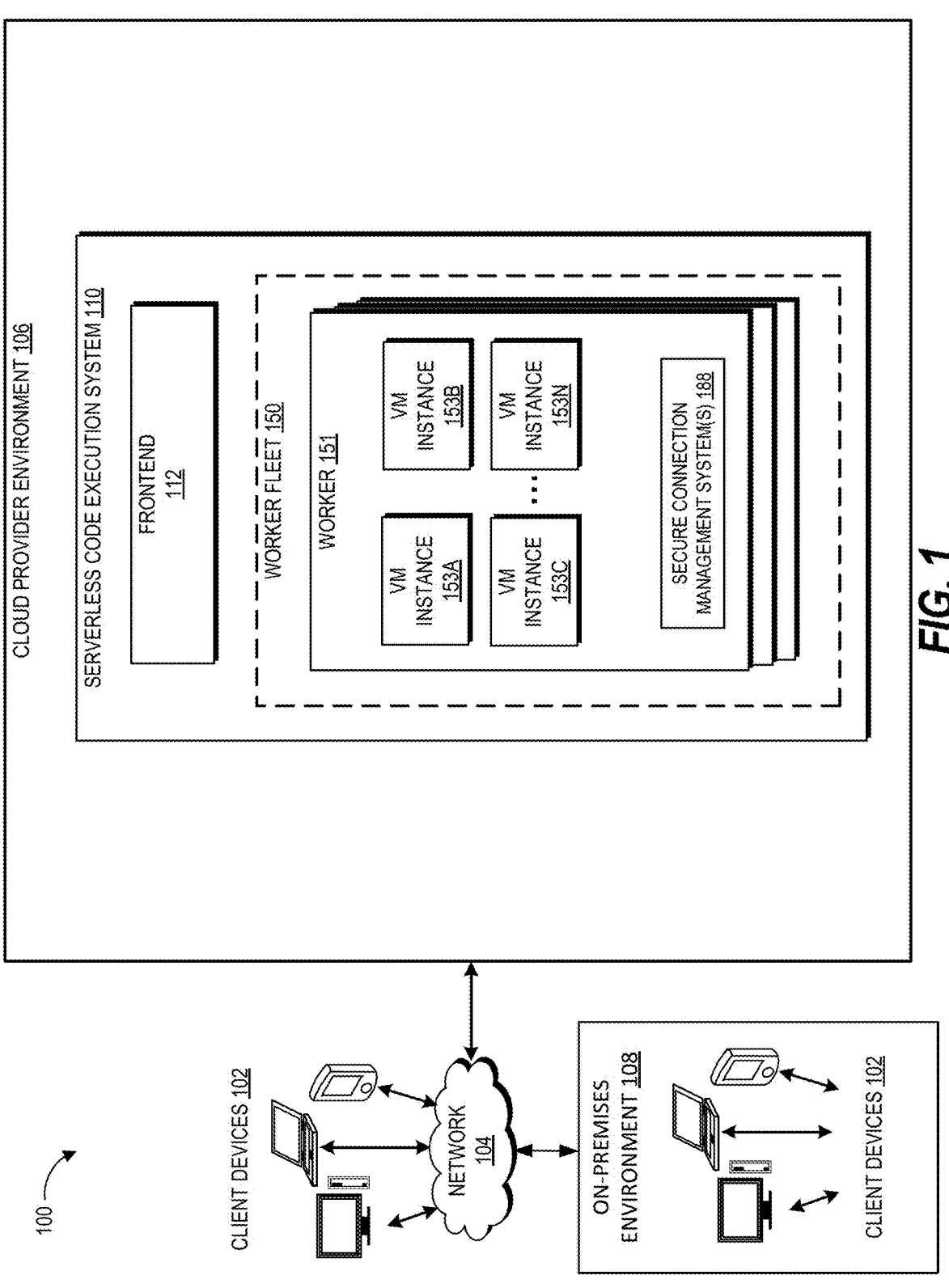
FIG. 1 is a block diagram depicting an illustrative environment in which a cloud provider environment enables secure network connection between executions of serverless functions implemented on a virtualized networking service and an on-premises environment.

Generally described, aspects of the present disclosure relate to supporting communication between one or more serverless instances (also referred to herein as "function execution environments") and an environment external to a serverless computing environment hosting the serverless instance (also referred to herein as an "external environment," for brevity) through a connection in an isolated execution environment (also referred to herein as a "secure network connection," for brevity). Such functionality can extend benefits of existing serverless offerings at least by enabling users to focus on development of their serverless applications while allowing the secure management connection system to implement and manage their secure network connection in the isolated execution environment. Specifically, aspects of the present disclosure automatically implement and manage a secure network connection between the serverless function and the external environment in an isolated execution environment.

In modern computing environments, serverless platforms are becoming increasingly popular due to their scalability, cost-effectiveness, and ease of deployment. However, existing serverless solutions require significant overhead in computing resources and development time to enable communication between the serverless instances of a serverless computing environment (also referred to herein as a "serverless platform") and an external environment, such as on-premises environments. "On-premises environments" may be private data centers, client networks, or the like, including one or more computing devices (e.g., servers, data stores, etc.).

In typical serverless technologies, a cloud provider service handles the underlying server infrastructure. Illustratively, as used herein, a serverless code execution system (which may also be referred to as an "on-demand code execution system") enables rapid execution of source code, which may be supplied by users of the on-demand code execution system. For example, a user may submit code in a specific programming language (e.g., the PYTHON™ language) that, when executed, implements network-based processing for a user-facing application (e.g., a mobile device "app"). The serverless code execution system can then enable the user to submit "calls" or "invocations" to execute that code, at which point the system will securely execute the code to provide the desired functionality. Embodiments for providing a serverless code execution system are provided, for example, in U.S. Pat. No. 9,323, 556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, an on-demand code execution system can enable client devices to submit executable code (e.g., source code) implementing desired functionality, which functionality is generally referred to herein as a "task" or a "function." The system can further enable a client device to define one or more triggers that result in execution of the code on the system. For example, a client device may request that each time a specific application programming interface (API) call is made, the code should be executed on the serverless code execution system. When a trigger occurs, the serverless code execution system can configure an execution environment for the code, which may correspond to a virtual machine instance, a software container, or other logically isolated environment in which code can execute. The serverless code execution system can then execute the code within the environment, resulting in a task execution. When the task execution completes, the serverless code execution system can remove the environment, thus freeing computing resources for other task executions.

Unlike some other network-based services, a serverless system (of which a serverless code execution system is one example among many, including serverless data storage, data transformation, data stream handling, data searching, and databases) can remove the need for a user to maintain or configure a computing device, either virtual or physical, to support serverless functionality. Due to this lack of need for a user to maintain a device, serverless systems are referred to as "serverless" (though of course the serverless system itself, as opposed to individual users, may maintain servers to support serverless functionality).

A serverless system implementing a serverless service (e.g., a network-based service that implements functionality of the server in a serverless manner) may be provided as part of a variety of network-based services. For example, a serverless system may be provided as part of a hosted computing environment providing a number of rapidly provisioned and released computing resources. A hosted computing environment may also be referred to as a "cloud provider environment." Illustratively, a cloud provider environment may include a distributed set of physical computing resources that can be rapidly acquired for use by users of the cloud provider environment. Often, the cloud provider environment can provide resources to users in the form of virtualized compute resources, such as virtual machines, virtual storage volumes, various other functionalities implemented using virtual machines or storage volumes, etc. In addition, a cloud provider environment may provide for virtualized networking functionality. For example, the cloud provider environment can include a variety of distributed systems in communication via a physical substrate network. The cloud provider environment may define multiple virtualized logical networks on top of the physical substrate network, via which resources on the environment can communicate. For example, the cloud provider environment may enable clients to acquire access to virtual computing resources (e.g., virtual machines) that are provided with network addresses in a logical network. In some cases, these network addresses may be isolated from other resources. For example, a set of network resources may share a specific subnet (e.g., a /24 IP version 4 subnet in Classless Inter-Domain Routing or CIDR notation) and have no access to network resources outside that subnet, or access limited by various network functionalities (e.g., a firewall). Thus, using a cloud provider environment, a user may acquire a variety of compute resources (such as virtual compute resources) and arrange such resources into an isolated network. As a result, users may acquire computing resources similar to those provided by traditional data centers, without requiring that the end user physically manage computing devices, networks, or the like.

In addition to serverless code execution systems, other types of serverless services may also exist. This may include other types of serverless computes, such as serverless machine learning models, serverless Audio/Video processing, serverless extract, transform, and load (ETL), etc. Other types of serverless services may also include types of serverless data storage, such as serverless databases, data lakes, data stream handling, data transformation, serverless search systems, etc.

At a high level, serverless systems may provide serverless functionality by obtaining requests that require computing resources and programmatically identifying, allocating, and managing those resources to respond to the requests. For example, a serverless code execution system may operate by accepting requests to execute code, identifying, allocating, and managing an execution environment to execute the code (including, e.g., provisioning the environment with the code, any dependencies, etc.), and then instructing the environment to execute the code in response to the requests. An environment for serverless functionality may be referred to as an "instance" of the functionality (a "serverless instance"). Each serverless instance is illustratively implemented using an underlying host computing device, potentially using one or more virtualization layers (e.g., a virtual machine, a software container, or the like).

To provide networking functionality, the host computing device generally can include a physical network interface controller (NIC). Depending on the configuration, a serverless instance may access a network directly via the physical NIC or via a virtual NIC (e.g., an elastic network interface (ENI)) layered on top of the physical NIC. As part of the process of managing the serverless instance, the serverless system can configure the (physical or virtual) NIC with an IP address, firewalls, etc.

Because the server infrastructure is abstracted away, an end user of the typical serverless technology, such as the serverless code execution system described above, may accordingly increase focus on development of their software applications. However, in some typical solutions, aspects of the network functionality may still require users to invest overhead in development and management of communications to an external environment, such as an on-premises environment.

By way of example, a function code of the user, when executed within the serverless instance, may require access to data or services on the on-premises environment. To enable this functionality, a user may, for example, implement a virtual private cloud (VPC) attached to a serverless instance of the serverless platform. The user-managed VPC may include a gateway allowing access to the user's on-premises environment through a network, such as the internet. One issue with this approach, utilizing a user-managed VPC, is that may expose the serverless instance to the internet, which may increase security risks associated with execution of the code, such as risk of exposure to malware. Additionally, issues caused by execution of the function code, such as caused by errors in the code, malware, or the like, may impact the VPC and may further impact the user's on-premises environment. Moreover, the user would be required to setup and manage the VPC, which would increase use of computing resources by the user, such as by increasing requirements for processing and storage resources for managing the communication between the serverless instance and the on-premises environment.

As another example, a user may set up a connection within the serverless function. The user may, in further examples, include code within the function to establish a VPN connection to the user's on-premises environment. This approach may require significant investment in development time and computing resources. Moreover, the approach may be inefficient at least because the VPN connection would need to be restarted every time the code of the serverless function is executed. Additionally, the approach may have security risks at least due to dependencies within the function code on third party code. Execution of the third party code may interfere with operation of the VPN connection, such as by utilizing computing resources necessary for operation of the VPN connection. As another example, the third party code may be malicious. The VPN connection may, for example, utilize cryptographic keys for connection. If malicious code is executed by the serverless function it may obtain the keys. With the keys, it could create a separate connection into the on-premises environment. By creating the secure network connection in an isolated environment separated from execution of the serverless function, the keys have a reduced risk of exposure to potentially malicious code.

The above challenges, among others, are addressed by embodiments of the present disclosure, which address these limitations by utilizing a secure connection management system to implement and manage a connection between the on-premises environment and serverless functions or applications in an isolated execution environment. The secure network connection may provide security and isolation benefits while reducing overhead for the users in setting up and managing the communication.

Aspects of the present disclosure address these problems, among others by providing support for a secure connection management system corresponding to serverless instances hosting serverless functions. The secure connection management system allows the end user to provide connection configurations, such as virtual gateway configurations, direct connection configurations, or the like. The secure connection management system then automatically generates a secure network connection in an isolated execution environment linking the serverless function and on-premises computing resources while isolating the communication through the secure network connection from execution of the serverless function code.

The secure connection management system may automatically establish, for example, a virtual connection in an isolated execution environment. The isolated execution environment may include, for example, the host computing device hosting the virtual machine instance (referred to herein as a worker). The secure connection management system may establish a virtual connection by establishing a system-managed VPC attached to a serverless instance. This advantageously avoids the aforementioned issues described with respect to user-managed VPCs at least because the user would not be required to setup and manage the VPC.

The secure connection management system may, additionally, or alternatively, enable utilization of a direct connection, such as through fiberoptic cables, between the serverless instance and the on-premises environment in the trusted space. The direct connection may, in some examples, be used by the secure connection management system with a system-managed VPC or VPN connection to establish a secure connection. However, in some examples, the direct connection may be established without requiring a system-managed VPC, VPN connection, or the like, to directly establish a secure connection with an external environment, such as an on-premises environment.

The secure connection management system may, in some examples, utilize a VPN connection alone or in addition to a system-managed VPC based connection. a direct connection, and the like, or some combination thereof. Aspects of the present disclosure described herein advantageously reduce the issues described above with respect to use of a VPN connection at least by improving efficiency and security, as described further herein. Establishing the secure network connection in the isolated execution environment may advantageously improve efficiency, in some examples, at least by allowing the secure connection management system to reuse the connection of a given environment across invocations of a serverless function.

With respect to security, one advantage of serverless technologies is that code execution for each serverless function is often isolated by virtualization boundaries, which separate the underlying server infrastructure from the code of the serverless function. This abstraction of serverless infrastructure makes it easier to isolate and contain issues caused by code execution of the serverless function, such as errors in the function code, crashes, malware, or the like. Accordingly, the secure connection management system or systems of the present disclosure may also address security with respect to communication between the serverless instances and an on-premises environment. A secure connection management system may, for example, establish a secure network connection in the worker as isolated from the serverless instance(s) with the one or more virtualization boundaries.

Illustratively, the serverless instances may operate as logically partitioned execution environments within a partitioned user space on the worker. The secure connection management systems may thereby operate in a separate, isolated execution environment from the serverless instance(s). This isolation may advantageously protect information included in the on-premises environments, such as confidential data, from the operations of the serverless instances. By way of illustration, if a serverless instance has a failure (e.g., errors, crashes, malware issues), the secure connection management system may close down the secure network connection thereby protecting the resources of the on-premises environment.

As another example, the serverless connection management systems may be isolated in separate execution environments from their corresponding serverless instance through implementation on one or more "offload cards." Each offload card can include an isolated processor and memory within a bare metal computing instance that is capable of configuring a serverless instance and, in some cases, controlling inputs to and outputs from the serverless instance. Accordingly, implementation of secure connection management systems on an offload card may create a physical boundary between a secure connection management system and its corresponding serverless instance, at least because the secure connection management system will run on a processor of the offload card and the serverless instance will run on a processor of a separate server (e.g., of at least one cloud provider server). The physical boundary between the processors may advantageously increase the security of an on-premises environment communicating with the serverless instance through a secure network connection established and managed by the secure connection management system.

The above-described aspects and other aspects of the disclosure will now be described with regard to certain examples, embodiments, and aspects, which are intended to illustrate, but not limit, the disclosure. The foregoing aspects and many of the attendant advantages of this disclosure will become more readily appreciated as the same become better understood by reference to the following description, when taken in conjunction with the accompanying drawings.

FIG. 1 is a block diagram of an illustrative execution environment 100 in which embodiments of the present disclosure may be implemented. Specifically, in FIG. 1, client devices 102 may utilize a network 104 to interact with a cloud provider environment 106. The cloud provider environment 106 includes a serverless code execution system 110 (also referred to herein as a "serverless execution environment" or a "serverless computing environment") facilitating execution of a serverless function, one or more secure connection management system(s) 188 to support establishment and management of a secure network connection, such as a direct connection, virtual connection, or the like, or some combination thereof, between serverless functions (e.g., hosted on VM instances 153) and an external environment, such as on-premises environment 108. In accordance with aspects of the present disclosure, the cloud provider environment 106 may facilitate establishment and management of communication between on-premises environments (e.g., on-premises environment 108), and server-less functions (e.g., hosted on VM instances 153) implemented on a virtualized networking service.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The cloud provider environment 106 may provide the client devices 102 with one or more user interfaces, command-line interfaces (CLIs), application programing interfaces (APIs), and/or other programmatic interfaces for utilizing services provided by the cloud provider environment 106. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the cloud provider environment 106. Additionally, one or more client devices 102 are part of on-premises environment 108. However, one or more client devices 102 are also external to on-premises environment 108.

The client devices 102 and cloud provider environment 106 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Illustratively, various components of the cloud provider environment 106 are in communication with one another via a substrate network. The substrate network may be dedicated to management and operation of the cloud provider environment 106, and thus inaccessible to, for example, the network 104. Rather, the substrate network can support virtualized logical networks that operate "on top" of the substrate network to facilitate secure communication between particular elements of the cloud provider environment 106. The secure connection management system(s) 188, as described herein, can therefore use the substrate network to send communications from VM instances 153 through the cloud provider environment 106. These virtualized logical networks are illustratively dynamic and reconfigurable, such that communication between certain elements or components of the cloud provider environment 106 can be controlled by reconfiguration of virtualized logical networks, as opposed to physical modification of the substrate network.

The cloud provider environment 106 includes a serverless code execution system 110. In FIG. 1, end users, by way of client computing devices 102, may interact with the serverless code execution system 110 to provide source code, and establish rules or logic defining when and how such code should be executed on the serverless code execution system 110, thus establishing a "task" or "function." The end users may (e.g., by way of client computing devices 102), in some examples, also provide a connection configuration specifying parameters including, but not limited to, access configurations to computing resources (e.g., client computing devices 102) of an on-premises environment, routing configurations, or the like.

Illustratively, end users may provide connection configuration settings through an API. The connection configuration settings may then be provided to the worker 151 through a frontend, such as frontend 112 of FIGS. 3A-3B. The worker 151, can establish a secure network connection in accordance with the connection configuration settings, such as by utilizing secure network connection configuration system 188. The connection configuration settings provided through the API can, for example, be implemented as part of a VPC managed by a secure network connection configuration system 188. The VPC may include virtual NICs, such as ENI attached to the serverless instance hosting the serverless function. The secure network connection configuration system 188 may, as another example, establish a secure network connection with an on-premises environment through a VPN tunnel created in accordance with the connection configuration. The secure network connection configuration system 188 may additionally, or alternatively, establish a secure network connection with on-premises computing resources using a direct connection, as will be described further herein at least with respect to FIG. 2.

The secure network connection configuration system 188 may manage the secure communication as described with respect to FIGS. 3A-5 herein. The serverless code execution system 110 may, in some examples, include a frontend 112, through which an end user can submit and configure serverless function(s) (e.g., hosted on VM instance(s) 153). An end user may illustratively provide connection configurations through the frontend 112 to support execution of the various serverless functions, which may potentially require communication to on-premises environment 108 through external networks, such as network 104.

For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. To avoid the complexity of this process, the user may alternatively provide the code to the serverless code execution system 110, and request that the serverless code execution system 110 execute the code using one or more execution environments that are managed by the serverless code execution system 110. The serverless code execution system 110 can handle the acquisition and configuration of compute capacity (e.g., containers, instances, etc., which are described in greater detail below) based on the code execution request and execute the code using the compute capacity. The serverless code execution system 110 may automatically scale up and down based on the volume of requests to execute code, thereby relieving the user from the burden of having to worry about over-utilization (e.g., acquiring too little computing resources and suffering performance issues) or under-utilization (e.g., acquiring more computing resources than necessary to run the code, and thus overpaying). The serverless code execution system 110 may, in some examples, establish and manage a secure network connection between the serverless functions and the on-premises computing resources of an on-premises computing environment (e.g., on-premises environment 108). By way of illustration, running a piece of code in connection with a web or mobile application that the user has developed, may require accessing an external API or data source (e.g., a data source in on-premises environment 108 of FIG. 2). Accordingly, the serverless code execution system 110 may generate a message for communication (e.g., an access request), such as with a function running the piece of code in a first execution environment. Although FIG. 1 depicts a serverless code execution system 110, this is not meant to be limiting. The cloud provider environment 106 may also include other serverless services, such as other compute functionalities, data storage, and networking.

Code executions triggered on the serverless code execution system 110 of FIG. 1 are executed by execution environments hosted by a worker 151 within a worker fleet 150. Illustratively, an end user may invoke a function from one of the client devices 102 to the serverless code execution system 110 (referred to in various implementations as an on-demand code execution service, serverless compute service, function compute service, functions service, cloud functions service, or functions-as-a-service). The serverless code execution system 110 then can distribute execution instructions for the function and instruct the worker 151.

The worker 151 is illustratively a host computing device configured to host multiple execution environments, which in FIG. 1 are virtual machine VM instances 153A-N. In some implementations, virtual machine VM instances 153A-N may be managed by a compute service that the serverless code execution system 110 can call via API to create and terminate virtual machines, as needed to run serverless workloads. Execution environments may alternatively include software containers, sometimes referred to as "OS-level virtualization," another virtualization technology. These may be managed by a container service and run on top of the virtual machines of the compute service, in some implementations, and in other implementations the containers may be run directly on a host with the runtime virtualized to them by the host controller. Thus, where references are made herein to VM instances 153, it should be understood that (unless indication is made to the contrary) a container may be substituted for such VM instances 153.

As used herein, the term "virtual machine instance" is intended to refer to an execution of software or other executable code that emulates hardware to provide an environment in which software may execute (an "execution environment"). Due to their emulation of hardware, these virtual machine instances are sometimes referred to as "system virtual machines." System virtual machines are different than, for example, process virtual machines that do not emulate hardware. Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, the worker 151 may host a number of VM instances 153A-N. Each instance 153 may be isolated from other VM instances 153, thus ensuring the security of code executions on the serverless code execution system 110. For example, each VM instance 153 may be divided by a virtualization boundary, by virtue of the VM instance 153 being a virtual machine hosted by the worker 151. In addition, each VM instance 153 may exist within a partitioned user space on the worker 151, which logically partitions resources of the worker 151 among VM instances 153. Each user space may, for example, represent a "chroot" jail-a known isolation technique for LINUX™ operating systems.

To facilitate rapid execution of code, the worker 151 may be configured to maintain a set of VM instances 153 in a "pre-warmed" state, being at least partially configured to begin execution of code. For example, instances may be created on the worker 151 and configured with access to computing resources (CPU, RAM, drive storage, etc.). In some cases, it may be impractical or impossible to maintain VM instances 153 in a fully warmed state for all possible code executions, as executions may be associated with a wide variety of at least partially distinct data sets (e.g., disk images and/or snapshots). Thus, VM instances 153 may be maintained in a "greatest commonality" for a given group of tasks, such as being provisioned with a set of computing resources common to those tasks, being configured to accept an operating system type used by those tasks, etc.

On receiving instructions to provision a VM instance 153 to support execution of the task, the worker 151 may adjust the configuration of the VM instance 153 to support that execution. Specifically, the worker 151 may provision the VM instance 153 with access to a disk image or snapshot corresponding to the task. In some instances, the worker 151 may retrieve the disk image for the task and store the full image locally. In other instances, the worker 151 may provide to a VM instance 153 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020, and entitled "LOW LATENCY ACCESS TO DATA SETS USING SHARED DATA SET PORTIONS" (the "'250 Application") the entirety of which is hereby incorporated by reference.

According to some aspects of the present disclosure, VM instances 153 may generate access requests with respect to on-premises computing resources. Illustratively, a VM instance 153 may host a function running the piece of code in connection with a web or mobile application that the user has developed. The code may require accessing a specified external API, data source, the like, or some combination thereof. The specified external API, data source, the like, or some combination thereof may be included in on-premises computing resources. The function may therefore generate access requests, or the like, to request the specified data or service required by the function. The serverless code execution system 110 may, in some examples, establish and manage the secure network connection with secure connection management system(s) 188.

In some examples, a separate secure connection management system 188 may be present for each VM instance 153 to handle communications to and from an on-premises environment (e.g., on-premises environment 108) according to connection configurations provided for a serverless function of each VM instance 153 by an end user corresponding to an on-premises environment (e.g., through client device(s) 102). For example, the secure network connection in communication between a VM instance 153 and the on-premises environment 108 may only have access to certain data or resources based on the connection configuration.

In examples utilizing a single secure connection management system 188, different data structures may be used to store the connection configurations provided for different serverless functions associated with (e.g., executing on) different VM instances 153. Different resources may also be used in generating and managing the secure network connections from each VM instance 153 to the requested on-premises environment 108.

Operation of the secure connection management system(s) 188 within the worker 151 may serve to isolate the secure connection management system(s) 188 from the VM instance 153. This isolation may advantageously increase security of communications (e.g., requests, responses, other data items, etc.) traveling through a secure network connection established and managed by secure connection management system(s) 188. Because the secure connection management system(s) 188 run in the respective worker 151 rather than the VM instance 153, they are isolated by virtualization boundaries from the execution of function code associated with the serverless function executing in the VM instance 153. Because the function code is at higher risk of exposure to errors, crashes, malware (e.g., through dependencies on open-source libraries), or the like, this isolation may advantageously increase security of communications traveling through the channel. The isolation may further improve security with respect to the on-premises environment 108. By way of example, secure connection management system(s) 188 may close a secure network connection if an issue (e.g., error, crash, malware, etc.) is detected with respect to a VM instance 153.

While the above description references isolation through virtualization boundaries from execution of code in the VM instance 153, the secure connection management system(s) 188 may alternatively be isolated by physical boundaries. Secure connection management system(s) 188 may, for example, be implemented on an offload card. The VM instance 153 may, for example, include an ENI to which it can send data to the offload card for processing. The offload card may, in further examples, include the secure connection management system(s) 188 and establish the secure network connection to the on-premises environment 108 through the offload card. The isolation with the physical boundary may further improve security with respect to the on-premises environment 108.

While not shown in FIG. 1, the illustrative environment can further include one or more network services-either as part of or distinct from the cloud provider environment 106—which can interact with the serverless code execution system or other elements of the cloud provider environment 106. Network services can correspond to network-connected computing devices, such as servers, which generate data accessible to the cloud provider environment 106, receive data from cloud provider environment 106, or otherwise communicate to the cloud provider environment 106. For example, the network services can include web services (e.g., associated with the client computing devices 102, with the serverless code execution system 110, or with third parties), databases, really simple syndication ("RSS") readers, social networking sites, or any other source of network-accessible service or data source. In some instances, network services may be invoked by code execution on the serverless code execution system 110, such as by API calls to the network services.

The cloud provider environment 106 is a pool of network-accessible computing resources (such as compute, storage, and networking resources, applications, and services), which may be virtualized or bare-metal. The cloud provider environment 106 can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider environment 106 can provide on-demand, scalable computing services to users through a network, for example allowing users to have at their disposal scalable "virtual computing devices." These virtual computing devices have attributes of a personal computing device including hardware (various types of processors, local memory, random access memory ("RAM"), hard-disk and/ or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device.

Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider environment context, APIs provide a gateway for clients to access cloud infrastructure by allowing clients to obtain data from or cause actions within the cloud provider environment 106, enabling the development of applications that interact with resources and services hosted in the cloud provider environment 106. APIs can also enable different services of the cloud provider environment 106 to exchange data with one another. Users can choose to deploy their virtual computing systems to provide network-based services for their own use and/or for use by their clients or clients.

The cloud provider environment 106 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider environment 106, which may be provisioned in user accounts.

Cloud provider environment 106 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas. The disclosed techniques can provide clients with a cloud wide area network ("WAN") service that enables them to use the cloud provider backbone network to connect their own on-premises networks (as well as their networks hosted on the cloud provider environment 106) to one another.

Clients (e.g., through client devices 102) can connect to availability zones of the cloud provider environment 106 via a publicly accessible network (e.g., the Internet, a cellular communication network). Transit Centers ("TC") are the primary backbone locations linking clients to the cloud provider environment and may be co-located at other network provider facilities (e.g., Internet service providers, telecommunications providers). Each region can operate two TCs for redundancy. The cloud provider environment 106 may deliver content from points of presence outside of, but networked with, these regions by way of edge locations and regional edge cache servers (points of presence, or "PoPs"). In some implementations, the cloud provider environment 106 can include one or more cellular networks managed and provided by the cloud provider, which can include access points at a client's premise, and which can use in-region resources to run various parts of the network. Clients can connect their premises to one another using the disclosed cloud WAN service via TCs, cloud-provided cellular networks, and/or edge locations.

The cloud provider environment 106 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the provider network. For example, it may not be possible to route from a substrate network address to an address in a production network that runs services of the cloud provider. The secure connection management system 188, as described herein, may enable routing from a substrate network address, such as for a VM instance 153 to an on-premises environment (e.g., on-premises environment 108) that hosts client resources.

The cloud provider environment 106 may, for example, also include an overlay network of virtualized computing resources that run on the substrate (also referred to herein as the "substrate network," for brevity). In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets. The secure connection management system(s) 188, as described herein, may use the encapsulation protocol technology to handle communications between a VM instance 153 to an on-premises environment that hosts client resources.

The cloud provider environment 106 is depicted in FIG. 1 as operating in a distributed computing environment including several computer systems that are interconnected using one or more computer networks (not shown in FIG. 1), which operate to provide the cloud provider environment 106. The cloud provider environment 106 could also operate within a computing environment having a fewer or greater number of devices than are illustrated in FIG. 1. Thus, the depiction of cloud provider environment 106 in FIG. 1 should be taken as illustrative and not limiting to the present disclosure. For example, the elements of the cloud provider environment 106 or various constituents thereof could implement various Web services components and/or peer to peer network configurations to implement at least a portion of the processes described herein. The cloud provider environment 106 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Figure 2:
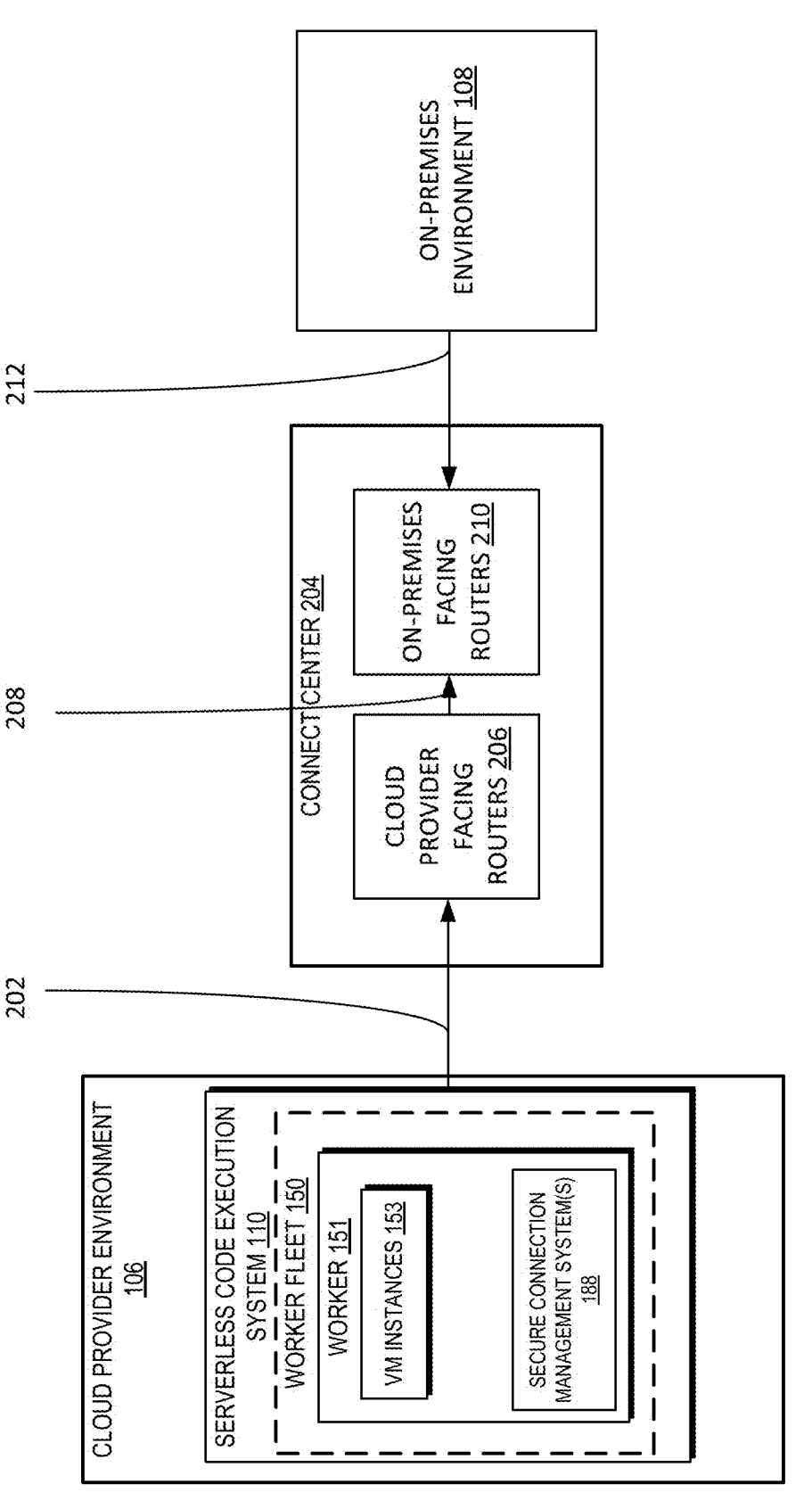
FIG. 2 is a logical model of connections between various elements of a serverless code execution system in a cloud-provider environment directly connecting with an on-premises environment.

FIG. 2 is a logical model of connections between various elements of serverless code execution system 110 in a cloud-provider environment 106 connecting with an on-premises environment 108 through a connect center 204. Once established, the logical model represents a secure network connection enabling a serverless function (e.g., executing in a VM instance 153) to communicate securely with on-premises environment 108. The secure network connection may, in some examples, extend from an isolated environment of the serverless code execution system 110. As noted above, the isolation advantageously improves security against issues relating to execution of the serverless function (e.g., errors, crashes, malware, etc.). The isolation of the secure network connection may also improve efficiency at least because the secure network connection does not need to be restarted each time the serverless function is invoked.

The connect center 204 may be a physical location including a plurality of routers to facilitate direct connections from resources of cloud provider environment 106 and resources of one or more on-premises environments, such as on-premises environment 108. As used herein, "direct connection" may refer to connection including one or more physical cables, such as ethernet cables. Some routers of the connect center may be cloud provider facing routers 206 connected through direct connection 202 to various components of serverless code execution system 110. Cloud provider facing routers 206 may, in some examples, also connect to other resources of cloud provider environment 106. Some routers of the connect center may be on-premises facing routers 210 connected through direct connection 212 to on-premises environment 108.

The serverless code execution system 110 may include a worker fleet 150 including a worker 151 hosting VM instances 153, as described with respect to FIG. 1. Worker 151 may, for example, logically partition the persistent storage of a physical server to support VM instances 153, such as by providing sufficient resources for performance of tasks by serverless functions hosted on VM instances 153.

The worker 151 includes one or more secure connection management system(s) 188 to support communication between one or more VM instances 153 and on-premises environment 108. The worker 151 may, in some examples, include one or more secure connection management systems 188. Illustratively, the worker 151 may include a secure connection management system for each VM instance 153.

Secure connection management system(s) 188 may be isolated from serverless functions executing on VM instances 153. The secure connection management system(s) 188 may, for example, operate on the worker 151 and may thereby be isolated through virtualization boundaries, as described with respect to FIG. 1. The isolation through virtualization boundaries may provide an additional layer of protection against issues from execution of the serverless functions (e.g., errors, crashes, malware, etc.), which may advantageously improve security of the communications between the VM instances 153 and on-premises environment 108. The isolation may further improve security of the on-premises environment 108 itself. Illustratively, if the execution of a serverless function runs into an issue (e.g., errors, crashes, malware, etc.), the secure connection management system(s) 188 may be protected due to the aforementioned isolation. The secure connection management system(s) 188 may, in further examples, close a secure network connection between the VM instance 153 hosting the serverless function and the on-premises environment 108. Operation of secure connection management system(s) 188 on worker 151 will be described in more detail herein, at least with respect to FIGS. 3A-4.

Figure 6:
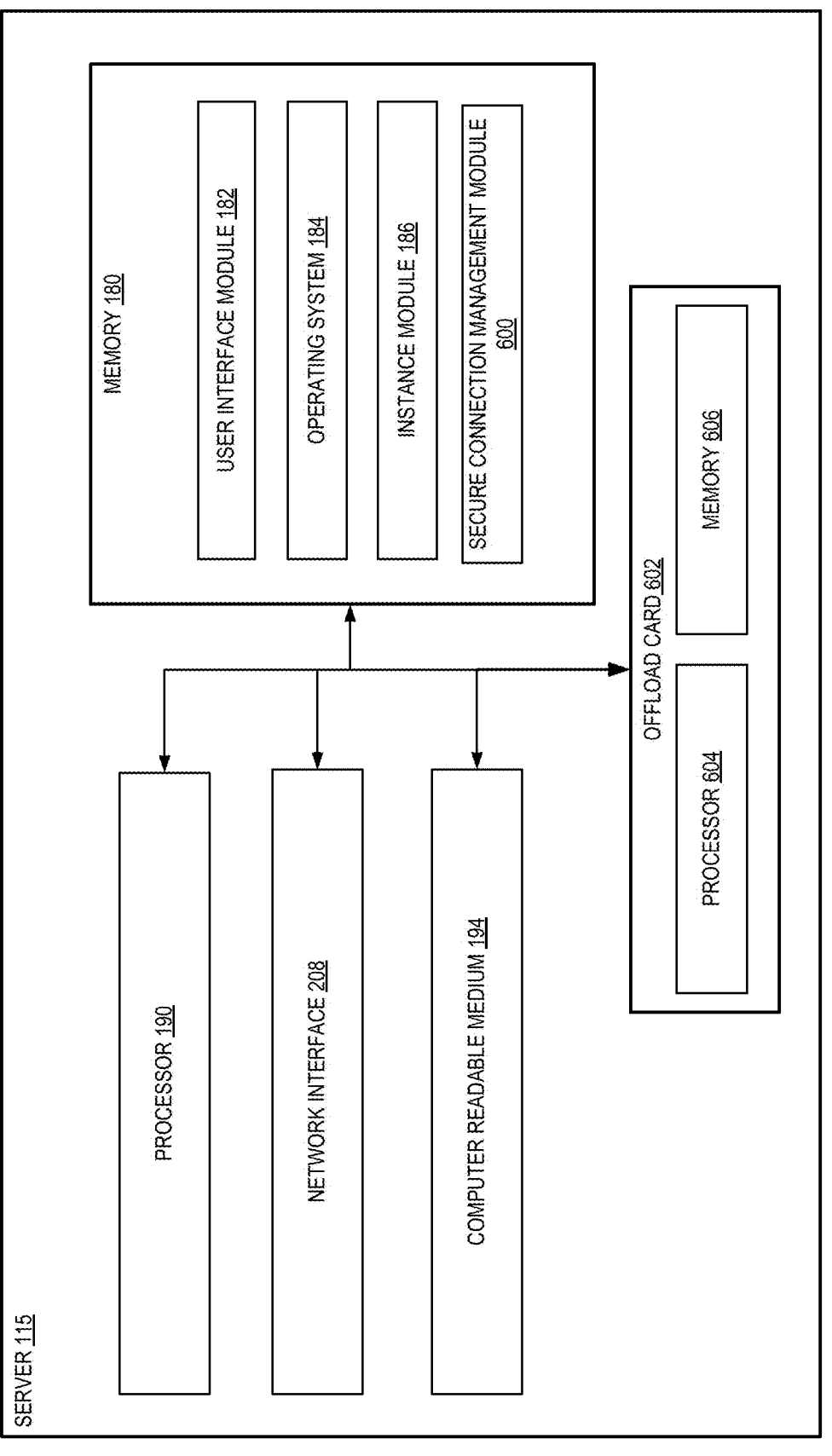
FIG. 6 depicts an example architecture of a server, which can be used to perform one or more of the techniques described herein or illustrated in FIGS. 1-5.

As another example, the secure connection management system(s) 188 may operate on an offload card, such as offload card 602 of FIG. 6. As noted above, an offload card may be a computing device including an isolated processor and memory within a bare metal computing instance that is capable of configuring a serverless instance and, in some cases, controlling inputs to and outputs from the serverless instance. Operation on the offload card can create a physical boundary between the secure connection management system(s) 188 and a VM instance 153, at least because the secure connection management system(s) 188 will run on a processor of the offload card and the VM instance 153 will run on a processor of a separate server (e.g., of a cloud provider environment 106 server). The physical boundary between the processors may advantageously increase the likelihood that the secure connection management system(s) 188 will remain uncompromised in the event that a serverless function executing on a VM instance 153 has run into an issue (e.g., coding errors, malware, etc.). By way of example, the physical boundary may be more resilient to side channel attacks that attempt to cross the virtualization boundary.

Figure 3A:
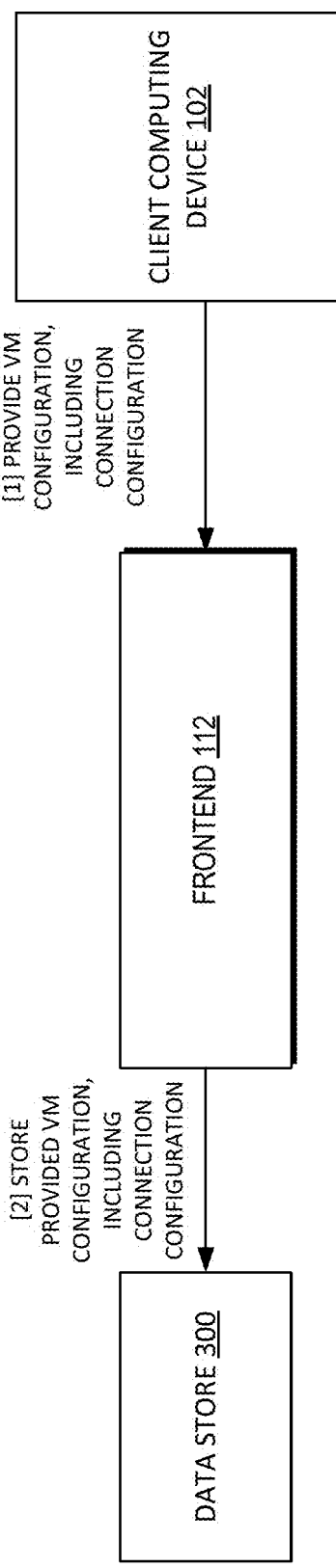
FIG. 3A depicts illustrative interactions between a client computing device, a frontend, and a data store in receiving a custom connection configuration for serverless functions for implementation on a serverless code execution system.

FIG. 3A depicts illustrative interactions between a client computing device 102, a frontend 112, and a data store 300 in receiving a custom connection configuration for serverless functions for implementation on a serverless code execution system (e.g., serverless code execution system 110). The illustrative interactions may advantageously allow an end user (e.g., through client device 102) to provide a custom connection configuration with respect to a serverless function prior to invocation.

A connection configuration may be used in establishing communication between a serverless function and the on-premises environment 108 after invocation. The connection configuration may, as illustrated in FIG. 3A, be submitted with a VM configuration for a VM instance hosting the serverless function. However, the connection configuration may, as another example, be submitted separately.

At [1], client computing device 102 provides a VM configuration, including a connection configuration to frontend 112. Frontend 112 may take input from an end user (e.g., through a client computing device 102). The input may include, but is not limited to, a VM configuration, including a custom connection configuration corresponding to a serverless function. The frontend 112 may, for example, include one or more APIs through which an end user (e.g., through client computing device 102) can provide the VM configuration, including the connection configuration.

The VM configuration may include specification of a task, such as supporting a web or mobile application. The VM configuration may, for example, include specification of a piece of code to be executed to support execution of a web or mobile application. By way of illustration, the piece of code may be to retrieve content (e.g., text, images, audio, videos, etc.) from a network-accessible data store. The piece of code may retrieve the content to conduct inventory status, for example.

The connection configuration may include, but is not limited to, a connection requirement, access permissions for resources within the on-premises environment 108, access permissions to other resources within the cloud provider environment 106, network addresses, routing information, or the like. The connection requirement may, in some examples, be a requirement to connect to a particular on-premises environment external to the serverless code execution system, such as on-premises environment 108.

The connection configuration may include, in some examples, specification of a type of connection including, but not limited to, a direct connection (e.g., through dedicated cables without virtualization), a virtual connection, or some combination thereof. A connection configuration for a virtual connection may, for example, provide configurations relating to creating a VPN tunnel along the substrate network to create a secure network connection with the on-premises environment 108, other resources of cloud provider environment 106, and the like, or some combination thereof. A connection configuration for a direct connection may, as another example, include specification of virtual interfaces (VIFs), routing policies, gateway specifications, and the like, or some combination thereof.

At [2], frontend 112 stores the received VM configuration, including the connection configuration, in data store 300. Data store 300 may correspond to any persistent data store. In one example, the data store 300 may be implemented as logical storage on a cloud storage service, such as an object storage system. An example of such an object storage system is AMAZON™'s SIMPLE STORAGE SERVICE™ (or "S3™"). Data store 300 may be accessible to a worker (e.g., worker 151). Worker 151 may, as will be described with respect to FIG. 3B, access data store 300 to retrieve the connection configuration during invocation.

Figure 3B:
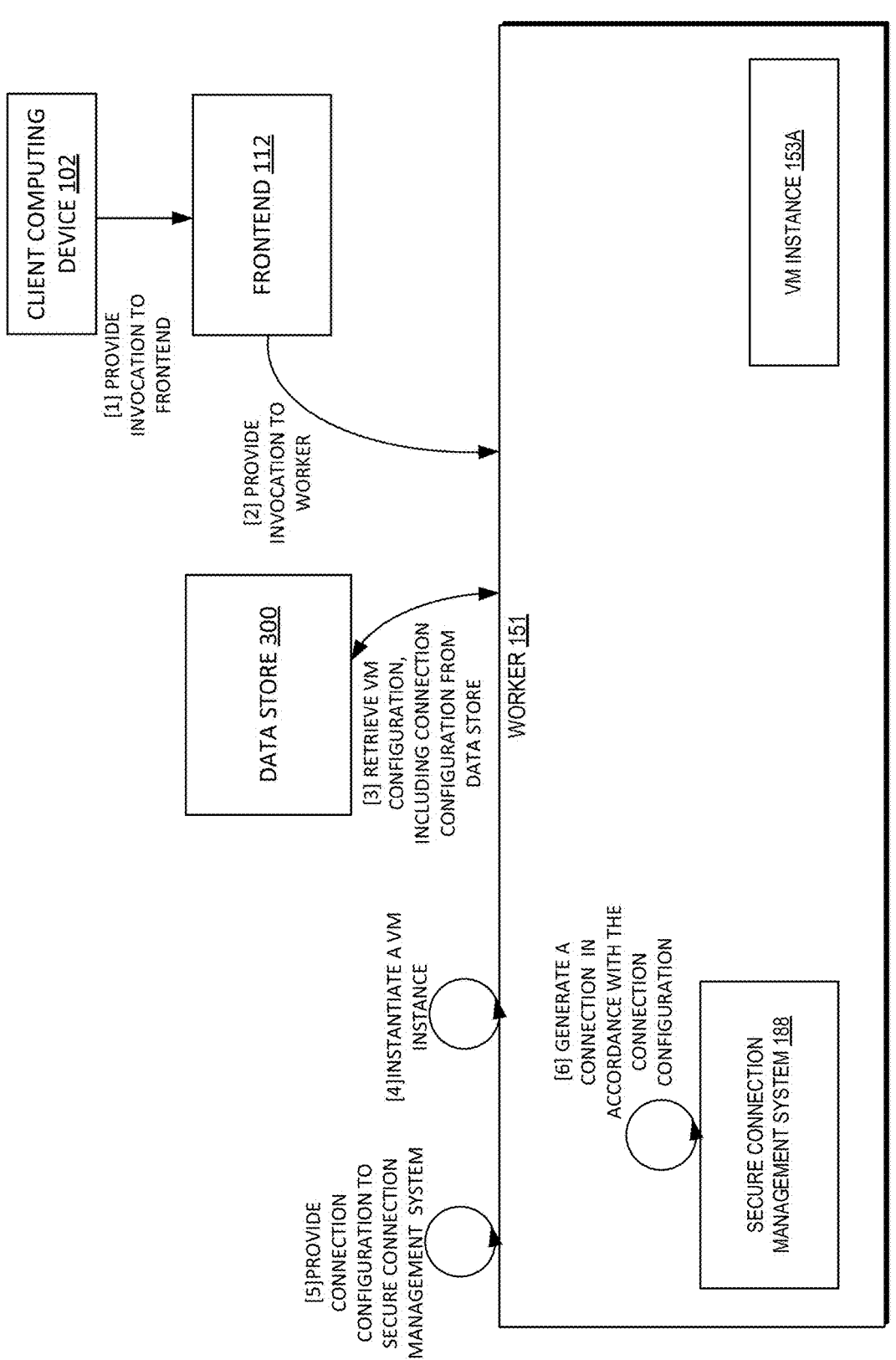
FIG. 3B depicts illustrative interactions between a client computing device, a frontend, a worker, a secure connection management system and a VM instance in setting up a secure network connection accordance with a custom connection configuration for serverless functions implemented on a serverless code execution system.

FIG. 3B depicts illustrative interactions between a client computing device 102, a frontend 112, a worker 151, a secure connection management system 188 and a VM instance 153A in setting up a secure network connection in accordance with a custom connection configuration for a serverless function implemented on a serverless code execution system (e.g., serverless code execution system 110). The interactions of FIG. 3B may take place during an invocation phase of the VM instance 153A's lifecycle. Execution of the interactions may advantageously allow an end user to customize connection configurations during invocation of the VM instance 153A. The interactions of FIG. 3B may set up a secure connection management system 188 isolated from VM instance 153A, which may improve the security of secure connection management system 188, as described above.

Secure connection management system 188, in some examples, handle communications corresponding to a particular VM instance corresponding to a particular serverless function, such as VM instance 153A. Secure connection management system 188 may, in other examples, be part of a single larger secure connection management system 188. Secure connection management system 188 may illustratively represent the components of the larger secure connection management system 188 while handling communications for VM instance 153A of the worker 151.

At [1], client computing device 102 provides an invocation request to frontend 112 for a serverless function. The end user, through client computing device 102 may, for example, provide the invocation request using an API of frontend 112. The client computing device 102 may have previously provided a VM configuration, a connection configuration, or the like, for the serverless function to the frontend 112. The connection configuration may have been provided to frontend 112, for example, using the interactions described with respect to FIG. 3A. As noted above, the connection configuration may include, but is not limited to, a connection requirement (e.g., to connect to on-premises network 108), access permissions for resources within the on-premises environment 108, access permissions to other resources with the cloud provider environment 106, network addresses, other routing information, or the like.

The serverless code execution system 110 may, in some examples, fetch an updated connection configuration from the from the client device 110. The secure connection management system 188 may, for example, trigger the frontend 112 at intervals (e.g., seconds, minutes, hours, days, months, etc.) to obtain updated connection configurations from the client device 102. The client computing device 102 may, as a further example, update the connection configuration via a client-side push command.

Once an updated connection configuration is received, the secure connection management system 188 may then update the secure connection to conform with the updated connection configuration. The secure connection management system 188 may, as another example, close the secure connection based on the prior connection configuration and establish an updated secure connection based on the updated connection configuration.

At [2], the frontend 112 provides the invocation to the worker 151. The frontend 112 may, for example, provide the worker 151 with instructions to execute the serverless function. The instructions may, in some examples, direct the worker 151 to the data store 300 for the VM configuration, including the connection configuration, previously provided for the serverless function.

At [3], the worker 151 retrieves the VM configuration, including the connection configuration from data store 300. The worker 151 may, for example, retrieve a VM configuration, including a connection configuration, corresponding to the serverless function.

At [4], based on the provided VM configuration, the worker 151 instantiates VM instance 153A. The worker 151 may, for example, instantiate the VM instance 153A by logically partitioning resources of the worker 151 to VM instance 153A to support execution of the task (e.g., supporting a mobile application, supporting a web application, etc.) specified in the VM configuration, as described with respect to FIG. 1. The worker may, in further examples, allocate additional resources for execution of the specified task at [1] to a pre-warmed instance, as described with respect to FIG. 1.

At [5], the worker 151 provides the connection configuration to the secure connection management system 188. The worker 151 may, in some examples, create the secure connection management system 188 based on the VM configuration, including the connection configuration received at [3]. The worker 151 may, for example, create the secure connection management system 188 as isolated from the VM instance 153A. Illustratively, the worker 151 may be a Linux kernel and logically partition the VM instance 153A into a "chroot" jail, as described with respect to FIG. 1. Secure connection management system 188 may operate within the worker 151's kernel. The secure connection management system 188, as another example, may be implemented on a physical card, such as the offload card, as described herein.

The secure connection management system 188 may intercept communication from the VM instance 153A to securely transmit communications to and from on-premises environment 108. The worker 151 may, for example, attach the secure connection management system 188 to an ENI of the VM instance 153A, where the ENI is the logical interface through which VM instance 153A would send data through the substrate network.

The secure connection management system 188 may, in some examples, act as a middleman and encapsulate the data item for transport through the substrate network, such as by using the encapsulation protocol technology described with respect to FIG. 1. A data item intended for an external environment, such as on-premises environment 108 may be further intercepted by another computing device (e.g., of cloud provider environment 106) and re-encapsulated for transmission through the internet. Because the secure connection management system 188 is implemented within the worker 151 such communications may advantageously by protected from issues with execution of the VM instance 153A (e.g., errors, crashes, malware, etc.). Use of the secure network connection management data in managing communications between VM instance 153A and on-premises environment 108 will be described in more detail with respect to FIG. 4. In some examples, encapsulation is performed selectively. For example, encapsulation technology may be applied to communications with certain on-premises sensitive database but not to communications with less sensitive database.

At [6], the secure connection management system 188 generates a secure network connection in accordance with the connection configuration. The secure connection management system 188, as an example, generate a VPN tunnel in accordance with the connection configuration to facilitate communication to the on-premises environment 108. The secure connection management system 188 may, additionally, or alternatively, generate a secure network connection along the substrate network to another computing device, such as an offload card, which establishes a direct connection to on-premises environment 108. Use of the secure network connection management data in managing communications between VM instance 153A and on-premises environment 108 will be described in more detail with respect to FIG. 4.

Figure 4:
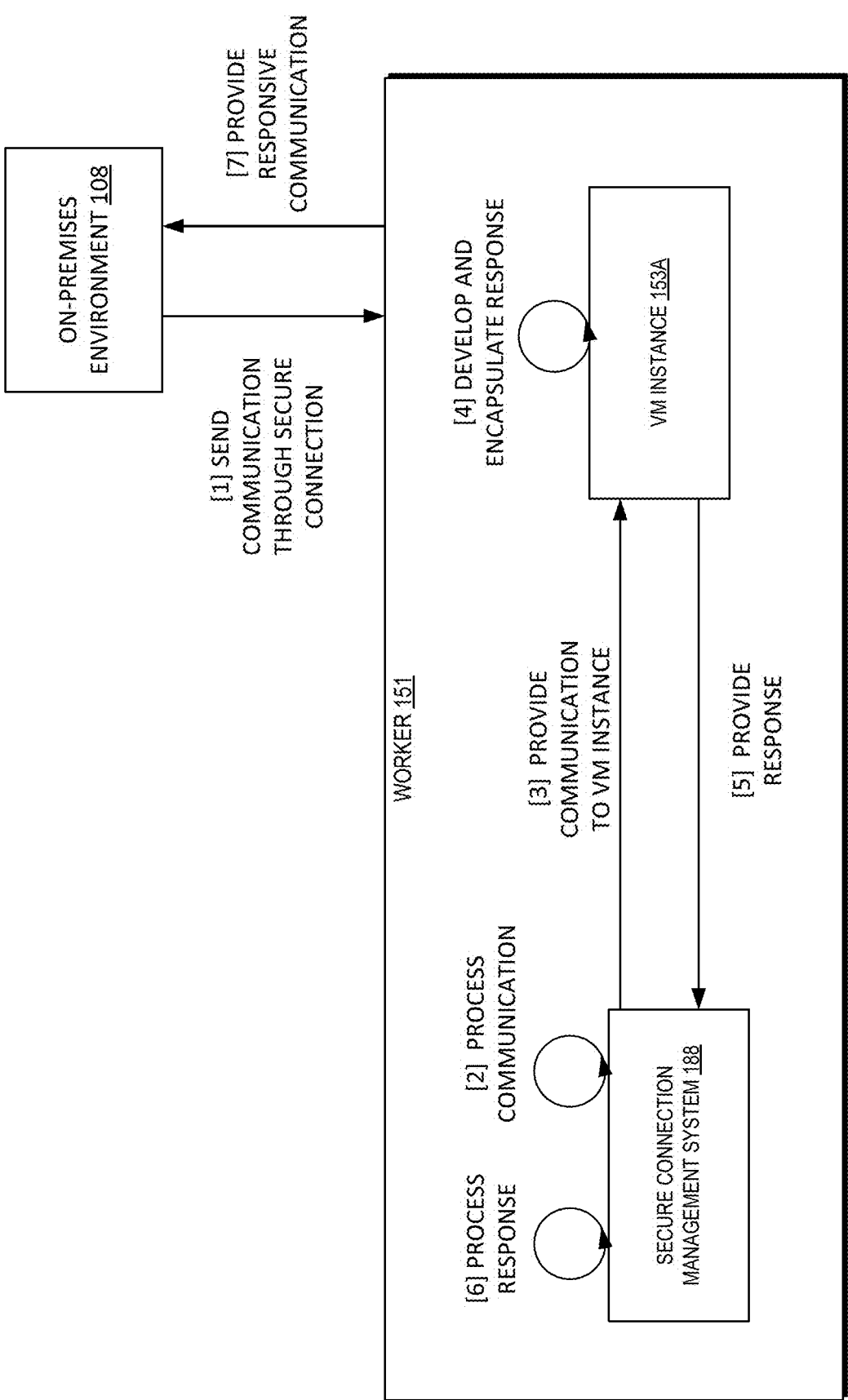
FIG. 4 depicts illustrative interactions between a client computing device, a worker, a secure connection management system and a VM instance in example communications between serverless functions implemented on a serverless code execution system and the on-premises environment.

FIG. 4 depicts illustrative interactions between an on-premises environment 108, a worker 151, a secure connection management system 188 and a VM instance 153A in example communications between serverless functions implemented on a serverless code execution system 110 and the on-premises environment 108. The illustrative interactions may advantageously allow an end user to securely exchange communications between the VM instance 153A hosting their serverless function and on-premises environment 108. The secure connection management system 188 may operate in an isolated environment with respect to the execution of the serverless function. This may advantageously improve security of communications between the VM instance 153A hosting their serverless function and on-premises environment 108.

The secure connection management system 188 may, for example, be able to detect issues with the VM instance (e.g., errors, crashes, malware, etc.) and close the secure network connection associated with the VM instance. This may, in further examples, lessen the impact of the issue on the on-premises environment. If the issue is malware, for example, the secure connection management system 188 may reduce the likelihood that the malware compromise data of the on-premises environment 108.

As described with respect to FIGS. 3A-3B, secure connection management system 188 may handle communications corresponding to a particular VM instance 153 corresponding to a particular serverless function, such as VM instance 153A. Secure connection management system 188 may, in other examples, be part of a single larger secure connection management system 188. Secure connection management system 188 may illustratively represent the components of the larger secure connection management system 188 when handling communications of VM instance 153A.

At [1], the on-premises environment 108 sends a communication through the secure network connection. By way of illustrative example, the on-premises environment 108 may be associated with a website. A user, through a client computing device 102, might request information on the availability of an item listed on the website. The request for information may trigger the on-premises environment 108 to send a request to check the inventory status to the VM instance 153A hosting the serverless function. The on-premises environment 108 may, for example, encapsulate the communication, including the request to check the inventory status, with the appropriate routing information and send the request through a secure network connection established by secure connection management system 188.

The secure connection management system 188 may have previously established the secure network connection using any of the methods described herein, such as with respect to FIG. 3B. The secure network connection may, in some examples, leverage a frontend, such as frontend 112 to receive the communication from the on-premises environment 108. The frontend 112 may then pass the communication to worker 151. On receipt of the communication, the worker 151 may provide the communication to secure connection management system 188. The worker 151 may, in some examples, act as a component supporting the secure network connection.

At [2], the secure connection management system 188 processes the communication for receipt by the VM instance 153A. The secure connection management system 188 may, for example, de-encapsulate the communication for provision to VM instance 153A The secure connection management system 188 may, in some examples, also decrypt the communication. With reference to the illustrative example at [1], the on-premises environment 108 may encrypt its request to check the inventory status prior to sending it through the secure network connection. Accordingly, at [2], the secure connection management system 188 may decrypt the communication prior to de-encapsulating the communication.

After processing the communication, the secure connection management system 188 may provide the communication to the VM instance 153A at [3]. The secure connection management system 188 may, in some examples, be attached to an ENI of the VM instance 153A. The secure connection management system 188 may, in further examples, provide the processed communication to the VM instance 153A through the ENI.

At [4], the VM instance 153A develops a response to the communication from the on-premises environment 108. With continued reference to the illustrative example, the communication may be a request for checking the inventory status. The serverless function hosted by the VM instance 153A may analyze the request and develop a response. The response may include, but is not limited to, confirmation that the item is available, an updated inventory, or the like, or some combination thereof. The response may, in some examples, further include requests to access resources of the on-premises environment 108 to complete the request. The response may, in further examples, include a request to access data locations of the on-premises environment 108, such as data locations corresponding to inventory status, or the like.

At [5], the VM instance 153A provides the response to the secure connection management system 188. The VM instance 153A may, for example, provide the response to secure connection management system 188 through the ENI, as described with respect to [3].

The secure connection management system 188 may, in some examples, evaluate the response to determine whether the response can be securely transmitted to the on-premises environment 108. As described with respect to FIGS. 3A-3B, the secure network connection between VM instance 153A and the on-premises environment 108 may correspond to a connection configuration. The connection configuration may include access permissions with respect to resources of the on-premises environment 108.

With continued reference to the illustrative example, the connection configuration may include access permissions with respect to data locations of the on-premises environment 108, such as data locations corresponding to inventory status, or the like. The secure connection management system may, in further examples, evaluate the response to determine whether the VM instance 153A has permission to access the requested data locations (e.g., for inventory status, or the like.). If not, the secure connection management system 188 may transmit an error message to the on-premises environment 108.

The on-premises environment 108 may alternatively close the secure network connection. The serverless function hosted on VM instance 153A may, for example, access resources through the internet during execution, such as when responding to a request. The internet location may be compromised resulting in VM instance 153A becoming compromised. Illustratively, if the VM instance 153A becomes compromised, this may be evidenced by sending out spurious access requests. Because of its isolation (e.g., through virtualization boundaries, through physical boundaries, etc.), the secure connection management system 188 may remain uncompromised. The secure connection management system 188 may thus close the secure network connection, which may advantageously improve the security of the on-premises environment 108.

The secure connection management system 188 may also close the connection responsive to coding errors present in the provided serverless function code. The function code may, for example, still be under development. The VM instance 153A may, in some examples execute the function code, which may cause issues that crash the VM instance 153A. The secure connection management system 188 may close the secure network connection between the VM instance 153A and the secure connection management system 188 responsive to the crash. This may reduce a likelihood of the issues which caused the VM instance 153A to crash also impacting on-premises environment 108.

At [6], the secure connection management system 188 processes the response. The secure connection management system 188 may, for example encapsulate the response for transmission through the secure network connection to on-premises environment 108, such as by using the encapsulation protocol technology described with respect to FIG. 1. If the response is to access particular resources of the on-premises environment 108, the secure connection management system 188 may, for example, add routing information directing the request to the requested resources. The secure connection management system 188 may further include access permissions to the requested resources, as provided in the connection configuration.

At [7], the worker 151 provides the response to the on-premises environment 108 through the secure network connection. As discussed with respect to FIG. 3B, the secure network connection may include a connection from a first offload card associated with the worker 151 along the substrate network to a computing device of the cloud provider environment 106 that is virtually or directly connected to on-premises environment 108, such as another offload card. The computing device may re-encapsulate the response with routing information for communication to the on-premises environment 108 at [7].

While the interactions described above, with respect to FIG. 4, illustrate the secure connection management system 188 as part of worker 151, the secure connection management system 188 may, in some examples, be part of another component of serverless code execution system 110. The secure connection management system 188 may, for example, be implemented on an offload card corresponding to worker 151. Implementation on an offload card may advantageously improve security by adding a physical boundary between the secure connection management system 188 and the execution of the serverless function on VM instance 153A.

FIG. 5 depicts an example method 500 for secure network connection between serverless functions implemented on a VM instance 153A and an on-premises environment 108. Some of the processes, steps, and/or modules discussed herein with respect to FIG. 5 may be combined, separated into sub-parts, omitted entirely, and/or rearranged to run in a different order and/or in parallel. In addition, in some embodiments, different blocks may execute on various components of a serverless code execution system, such as serverless code execution system 110 of FIG. 1. By way of illustration, the method 500 may be implemented by a secure connection management system 188 within a worker (e.g., worker 151 of FIGS. 1-4).

At block 502, based on a received connection configuration, the secure connection management system 188 generates a secure network connection between a VM instance 153A and an on-premises environment 108. The secure connection management system 188's operation within the worker may advantageously facilitate establishing the secure network connection such that communications through the connection are isolated from code execution on the VM instance 153A. This advantageously improves the security of the connection at least because establishing the connection within the worker 151 isolates the connection from the execution of function code on the VM instance 153A.

The connection configuration, as described with respect to FIGS. 1-4, may include custom configurations from the user for the serverless function. A connection configuration to establish a VPN connection through a virtual gateway may illustratively include, but is not limited to, routing information (e.g., destination network addresses, static routes, target virtual gateway, etc.), VPN protocol, encryption protocol, encryption keys (e.g., public keys, private keys, etc.), access permissions (e.g., to locations of the on-premises environment 108). A connection configuration to establish a direct connection may include, but is not limited to, routing information (e.g., prefixes for advertisement, allowed prefixes, border gateway protocol (BGP) configuration, routing policies, etc.). The connection configuration may, in some examples, include configuration for both virtual gateways and direct connect configurations. The secure connection management system 188 may illustratively establish a connection from a virtual gateway through the direct connect gateway to on-premises environment 108.

To establish the secure network connection, the secure connection management system 188 may, in some examples, set up an endpoint for the secure network connection within the worker 151. The secure connection management system 188 may, as described with respect to FIGS. 3A-4, be attached to an ENI of VM instance 153A. The secure connection management system 188 may thereby intercept communications from the VM instance 153A for processing and routing through the secure network connection to on-premises environment 108.

The secure connection management system 188 may, in some examples, first establish a system-managed VPC. The system-managed VPC may, for example, be established within the worker 151. The secure connection management system 188 may illustratively attach a virtual gateway to the system-managed VPC. However, in some examples, the secure connection management system 188 may attach a direct connect gateway to the system-managed VPC. The secure connection management system 188 may, as an example, attach a virtual gateway to the system managed VPC and associate a direct connect gateway with the virtual gateway. The secure connection management system 188 may, as another example, attach a transit gateway to the system-managed VPC and associate the transit gateway with the direct connect gateway. Once a gateway is attached to the system-managed VPC, the secure connection management system 188 may establish a connection from the gateway along the substrate network to the on-premises environment 108.

At block 504, the secure connection management system 188 obtains a communication from the VM instance 153A. The VM instance 153A may, as described herein, execute a serverless function of an end user. The function may, for example, process tracking inventory information for a service of the on-premises environment 108. To do so, the function may need to access resources of the on-premises environment 108, such as a data store including inventory status (e.g., of available items). On behalf of the function, the VM instance 153A may send a request for the resources as a communication through an ENI. The secure connection management system 188 may, as described with respect to FIGS. 3A-4, be attached to the ENI of VM instance 153A. The secure connection management system 188 may thereby intercept the communication from the VM instance 153A.

The secure connection management system 188 may, in some examples, block a communication from the VM instance 153A. The secure connection management system 188, as described with respect to FIGS. 3A-4, may be isolated from the operations of the serverless function. The secure connection management system 188 may, for example, be isolated through virtualization boundaries by operating in the worker 151. The secure connection management system 188 may, as another example, be isolated through physical boundaries through operation on an offload card. At least because of the isolation, the secure connection management system 188 may take actions, such as blocking communications through the secure channel, to reduce security risks to the on-premises environment 108.

By way of illustrative example, the serverless function executing on the VM instance 153A may become compromised, such as through inadvertent download of malware when accessing data from an internet location included in the function code provided by the end user. The infection of the VM instance 153A may, in some examples, be evidenced by sending out spurious communications, such as requests to access unauthorized resources of the on-premises environment 108. A spurious request sent by the VM instance 153A, when compromised, may requests access to an unauthorized resource, such as a resource not included in the access permissions provided in the connection configuration for the serverless function. The secure connection management system 188 may then close the secure network connection between the VM instance 153A and the on-premises environment 108. This action would advantageously improve the security of on-premises environment 108.

At block 506, the secure connection management system 188 determines a routing of the communication to the on-premises environment 108. As described with respect to block 502, for example, the connection configuration for the serverless function may include routing information. Based on the routing information, the secure connection management system 188 may generate headers indicating the source and destination of the communication along the secure network connection. The secure connection management system 188 may further encapsulate the communication with the headers. The secure connection management system 188 may, in some examples, encapsulate the communication with headers to a destination gateway internal to the cloud provider environment 106. The destination gateway may re-encapsulate the communication with routing information for transmission to the on-premises environment 108. However, in some examples, the secure connection management system 188 may encapsulate the communication with headers to reach the on-premises environment 108.

With continued reference to the illustrative example, the communication may be a request from the serverless function to access an inventory status stored by on-premises environment 108. The secure connection management system 188 may have established an endpoint of the secure network connection on a virtual gateway of a system-managed VPC. The secure connection management system 188 may, as one example, further encapsulate the communication to with a header including routing information to direct the communication from the system-managed VPC to a VPC at a network location of the cloud provider environment 106, such as a VPC hosting a direct connection gateway to on-premises environment 108. The direct connection gateway may then route the communication through the connect center 204 to the on-premises environment 108.

At block 508, the secure connection management system 188 routes the communication to the on-premises environment 108. With continued reference to the illustrative example, the system-managed VPC may route the encapsulated communication along the substrate network to a VPC at a network location of the cloud provider environment 106, such as a VPC hosting a direct connection gateway to on-premises environment 108. In routing the communication through the substrate network, the system-managed VPC may route the encapsulated communication to a first offload card. The first offload card may route the encapsulated communication to a second offload card attached to the VPC hosting the direct connection gateway. However, a system-managed VPC may, in some examples, not be required. The secure connection management system 188 may, for example, route the encapsulated communication through the secure network connection directly to the direct connection gateway.

While FIG. 5 describes the secure connection management system 188 as operating within the worker 151, at least some components of the secure connection management system 188 may, in some examples, operate on an offload card. The secure connection management system 188 may, in further examples, route the encapsulated communication through the secure network connection directly to the direct connection gateway through the offload card.

At block 510, the secure connection management system 188 securely relays a response from the on-premises environment 108 to the VM instance 153A. For example, the secure connection management system 188 would receive the response through the secure network connection, process the response to determine a routing to the VM instance 153A, and route the response to the VM instance 153A. The on-premises environment 108 may illustratively send the response through a direct connection to the cloud provider environment 106. With continued reference to the illustrative example, the response may be an inventory status (e.g., of available items). The response may, in some examples, be received by the VPC of the cloud provider environment 106 that includes a direct connect gateway. The VPC of the cloud provider environment 106 may de-encapsulate the response to determine its destination and re-encapsulate the response for transmission to the secure connection management system 188. The response may be received by the system-managed VPC of the secure connection management system 188 corresponding to the serverless function hosted by VM instance 153A.

The response may, additionally, or alternatively, be received by an offload card corresponding to the secure connection management system 188. The secure connection management system 188 may, for example, use the offload card to receive the response, de-encapsulate the response, re-encapsulate the response for receipt by VM instance 153A, and route the response to VM instance 153A (e.g., through the ENI of VM instance 153A.) The secure connection management system may, as another example, receive the response at the offload card, forward the response from the offload card to the system-managed VPC, de-encapsulate the response, re-encapsulate the response for receipt by VM instance 153A, and route the response to VM instance 153A (e.g., through the ENI of VM instance 153A.).

Method 500 may, in some examples, repeat. Method 500 may, for example, repeat on receipt of a request from on-premises environment 108 that triggers execution of the serverless function hosted by VM instance 153A. Method 500 may, as another example, repeat if the serverless function requires additional information from on-premises environment 108 (e.g., an updated inventory status).

FIG. 6 depicts an example architecture of a server 115, which can be used to perform one or more of the techniques described herein or illustrated in FIGS. 1-5. The general architecture of the server 115 depicted in FIG. 6 includes an arrangement of computer hardware and software modules that may be used to implement one or more aspects of the present disclosure.

The server 115 may include many more (or fewer) elements than those shown in FIG. 6. It is not necessary, however, that all of these elements be shown in order to provide an enabling disclosure. As illustrated, the server 115 includes a memory 180, a processor 190, a network interface

208, a computer-readable medium 194, and an offload card 602 all of which may communicate with one another by way of a communication bus. The network interface 208 may provide connectivity to one or more networks or computing systems. The processor 190 may thus receive information and instructions from other computing systems or services via the network 104 illustrated in FIG. 1.

The processor 190 may also communicate with memory 180. The memory 180 may include computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the server 115.

The memory 180 may further include computer program instructions and other information for implementing one or more aspects of the present disclosure. The memory 180 may, for example, include a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include an instance module 186 representing code executable to host VM instances, which may utilize components of the servers 115 (e.g., the processor 190, network interface 208, etc.) as virtualized hardware supporting execution of VM instances.

The memory 180 may additionally, or alternatively, include a secure network connection management module 600 representing code executable to operate secure connection management system 188 of FIGS. 1-5. Secure network connection management module 600 may illustratively store connection configurations corresponding to one or more VM instances 153. The secure network connection management module 600 may, in some examples, include VPN protocols, authentication credentials, encryption settings, routing information, access control information, and the like, for establishing a secure network connection in accordance with the connection configuration.

The network interface 208 may commonly support one or more wireless networking protocols (e.g., Wi-Fi/IEEE 802.11, or another wireless networking standard). However, in various embodiments, network interface 208 may support communication via any suitable wired or wireless general data networks, such as other types of Ethernet networks, for example. Additionally, network interface 208 may support communication via telecommunications/telephony networks such as analog voice networks or digital fiber communications networks, via storage area networks such as Fibre Channel SANs, or via any other suitable type of network and/or protocol. While the network interface 208 is shown as a separate component in FIG. 6, this is not intended to be limiting. The network interface 208 may be a component of offload card 602, according to some embodiments. In yet other embodiments, the offload card 602 may include a separate network interface from that of the compute server 115.

As discussed above, a VM instance (or other software executing within memory 180, particularly in the case of a "bare metal" instance) may thereafter interact with network-accessible services via interaction with the offload card 602. Interaction with the offload card 602 may be handled with network interface 208. Additionally, or alternatively, inter-action with the offload card 602 may be handled with a network interface of the offload card 602.

As shown in FIG. 6, the offload card 602 can include hardware isolated from other hardware of the compute servers 115. The offload card 602 may be implemented as an expansion card (e.g., PCIe card) installed on the server 115. The offload card 602 may also be a dongle that can be detachably connected to the server 115. As illustrated, offload card 602 may include a processor 604, and a memory 606, and possibly one or more network interfaces that are connected using an I/O interface (e.g., a bus implementing a version of the Peripheral Component Interconnect-Express (PCI-E) standard, or another interconnect such as a Quick-Path interconnect (QPI) or UltraPath interconnect (UPI)).

The offload card 602 may include many more (or fewer) elements than those shown in FIG. 6. For example, while FIG. 6 depicts offload card 602 with a single processor 604, this is not intended to be limiting. The offload card 602 may have multiple processors. Additionally, while FIG. 6 depicts offload card 602 with a single memory 606, the offload card 602 may incorporate multiple data storage components (e.g., memories). The offload card 602 may, in some examples, include instructions or data relating to operation of secure connection management system 188 of FIGS. 1-5. The offload card 602 may, for example, include secure network connection management module 600. It is not necessary, however, that all of these elements be shown in order to provide an enabling disclosure.

Processor 604 may include a single core. However, processor 604 may alternatively include multiple different cores. In some embodiments, offload card 602 may include multiple processors. In further embodiments, each processor may handle different types of operations. For example, one processor may handle compute intensive operations (e.g., cryptographic operations for secure communications) and another processor may handle latency-sensitive I/O operations, which require processing within specific time-constraints (e.g., to complete a given operation in a pre-defined amount of time such as milliseconds). To enable latency-sensitive operations, processor 604 may maintain a constant processing speed (as opposed to varying in speed), may lack or disable power states (e.g., C states or P states), may guarantee operations ordering (as opposed to reordering operations), etc.

The memory 606 may include processor instructions executable to facilitate operation of processor 604, such as establishing a secure network connection with a server device over a network by the processor 604, performing cryptographic operations, and/or implementing the virtual-ization manager to handle I/O communications between compute server 115 and a network-accessible storage devices. The memory 606 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

While FIG. 6 is depicted as the server 115, a similar device may be used to implement other elements of FIGS. 1-2. For example, a device having a similar configuration when programmed with appropriate modules may be used to implement servers 115, serverless code execution system 110, worker fleet 150, etc.

Terminology and Other Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-read-able storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some examples, the computer system may be a cloud-based computing system whose processing resources are shared by multiple distinct business entities or other users.

Depending on the example, certain acts, events, or func-tions of any of the processes or algorithms described herein can be performed in a different sequence, can be added, merged, or left out altogether (e.g., not all described opera-tions or events are necessary for the practice of the algo-rithm). Moreover, in certain examples, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the examples disclosed herein can be implemented as electronic hardware, or combinations of electronic hardware and com-puter software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and mod-ules described in connection with the examples disclosed herein can be implemented or performed by a machine, such as a processor device, a digital signal processor (DSP), an application specific integrated circuit (ASIC), a field pro-grammable gate array (FPGA) or other programmable logic device, discrete gate or transistor logic, discrete hardware components, or any combination thereof designed to per-form the functions described herein. A processor device can be a microprocessor, but in the alternative, the processor device can be a controller, microcontroller, or state machine, combinations of the same, or the like. A processor device can include electrical circuitry configured to process computer-executable instructions. In another example, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunc-tion with a DSP core, or any other such configuration.

Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without other input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection"

should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various examples, it can be understood that various omissions, substitutions, and changes in the form and details of the devices or algorithms illustrated can be made without departing from the spirit of the disclosure. As can be recognized, certain examples described herein can be embodied within a form that does not provide all of the features and benefits set forth herein, as some features can be used or practiced separately from others. The scope of certain examples disclosed herein is indicated by the appended claims rather than by the foregoing description. All changes which come within the meaning and range of equivalency of the claims are to be embraced within their scope.

What is claimed is:

1. A serverless code execution system comprising:
one or more computing devices implementing serverless code execution functions with one or more hardware processors, the one or more computing devices configured to:
receive a connection configuration for a serverless function, wherein the connection configuration specifies a connection requirement for an on-premises environment external to the serverless code execution system;
obtain an invocation of the serverless function in the serverless code execution system;
select a worker computing device within the serverless code execution system on which to execute a serverless instance of the serverless function; and
distribute, to the worker computing device, instructions to generate a serverless function execution environment in which to execute the serverless instance of the serverless function and instructions to establish, using the specified connection requirement, a secure network connection between the serverless function execution environment and the external on-premises environment; and
the worker computing device, wherein the worker computing device is further configured to:
receive a communication from the serverless function execution environment;
determine a routing of the communication to the external on-premises environment;
route the communication to the external on-premises environment via the secure network connection;
obtain a response to the communication from the external on-premises environment via the secure network connection; and
relay the response to the serverless function execution environment.

2. The system of claim 1, wherein, to route the communication to the on-premises environment via the secure network connection, the worker computing device is configured to:

encapsulate the communication in accordance with the determined routing; and route the encapsulated communication to the on-premises environment via the secure network connection.

3. The system of claim 1, wherein the worker computing device is further configured to generate, outside of the function execution environment, the secure network connection to the on-premises environment, and wherein to generate the secure network connection to the on-premises environment, the worker computing device is configured to:

establish a system-managed virtual private cloud (VPC); and attach a virtual gateway to the system-managed VPC.

4. The system of claim 3, wherein to generate, outside of the function execution environment, a secure network connection to the on-premises environment the worker computing devices is configured to establish an endpoint of the secure network connection in an offload card, wherein the offload card is a separate computing device communicatively coupled to a server hosting the worker computing device.

5. The system of claim 3, wherein to generate, outside of the function execution environment, a secure network connection to the on-premises environment, the worker computing device is configured to establish an endpoint of the secure network connection in the worker computing device.

6. A method for generating a secure network connection between a serverless function execution environment hosted by a serverless computing environment and an external on-premises environment, comprising:

receiving, by the serverless computing environment, a connection configuration including a permission to establish a communication between the serverless function execution environment and the external on-premises environment;

receiving, by the serverless computing environment, an invocation for a serverless function in the serverless function execution environment;

generating the serverless function execution environment in the serverless computing environment to execute an instance of the serverless function;

generating using the received connection configuration, outside of the serverless function execution environment, a secure network connection to the external on-premises environment;

receiving a communication from the serverless function execution environment;

determining a routing of the communication to the external on-premises environment; and routing the communication from the serverless function execution environment to the external on-premises environment via the secure network connection in accordance with the connection configuration.

7. The method of claim 6, wherein generating, outside of the function execution environment, a secure network connection to the external environment comprises:

establishing a system-managed virtual private cloud (VPC); and attaching a virtual gateway to the system-managed VPC.

8. The method of claim 6, wherein the connection configuration comprises a VPN protocol, and wherein generating, outside of the function execution environment, a secure network connection to the external environment comprises establishing, using the VPN protocol, a VPN tunnel from the function execution environment to the external environment through a substrate network, wherein the substrate network represents an overlay network of virtualized computing resources for a cloud provider environment.

9. The method of claim 6, wherein the connection configuration comprises access permissions for the external environment.

10. The method of claim 9, wherein the communication comprises a request to access specified resources of the external environment.

11. The method of claim 10, further comprising analyzing the request to determine that the specified resources are included in the access permissions.

12. The method of claim 10, further comprising:

analyzing the request to determine that the specified resources are included in the access permissions; and closing the secure network connection responsive to the communication.

13. The method of claim 6, further comprising routing a responsive communication from the external environment to the function execution environment, wherein routing the responsive communication comprises:

receiving the responsive communication through the secure network connection;

processing the responsive communication to determine a routing to the function execution environment; and routing the responsive communication to the function execution environment.

14. The method of claim 13, wherein processing the responsive communication to determine the routing to the function execution environment comprises:

de-encapsulating the responsive communication;

determining that a destination of the responsive communication is the function execution environment; and re-encapsulating the responsive communication with header information to facilitate internal routing to the function execution environment.

15. The method of claim 6, wherein generating, outside of the function execution environment, a secure network connection to the external environment comprises establishing an endpoint of the secure network connection in a host computing device, wherein the host computing device hosts the function execution environment.

16. The method of claim 6, wherein generating, outside of the function execution environment, a secure network connection to the external environment comprises establishing an endpoint of the secure network connection in an offload card, wherein the offload card is a separate computing device communicatively coupled to a server hosting the function execution environment.

17. One or more non-transitory computer-readable storage media storing instructions that, when executed, cause a computing system to perform operations of serverless code execution functions comprising:

running a secure connection management system in an isolated memory space, wherein the secure connection management system is configured to at least establish a secure network connection between a host computing device for a serverless instance and an external on-premises environment with respect to a serverless execution computing environment hosting the serverless instance;

receiving a connection configuration for the secure network connection with the secure connection management system:

receiving a communication from the serverless instance;

determining a routing of the communication to the external on-premises environment; and routing the communication to the external on-premises environment through the secure network connection.

18. The one or more non-transitory computer-readable media of claim 17, wherein to run a secure connection management system, the one or more non-transitory computer-readable media store further instructions that, when executed, cause the computing system to perform operations comprising:

establishing a system-managed virtual private cloud (VPC);

attaching a virtual gateway to the system-managed VPC; and establishing the secure network connection using the system-managed VPC and the virtual gateway.

19. The one or more non-transitory computer-readable media of claim 17, wherein the one or more non-transitory computer-readable media store further instructions that, when executed, cause a computing system to perform operations further comprising:

relaying a response from the external environment to the serverless instance, wherein relaying the response comprises:

receiving the response through the secure network connection;

processing the response to determine a routing to the serverless instance; and routing the response to the serverless instance through the secure network connection.

20. The one or more non-transitory computer-readable media of claim 17, wherein to route the communication to the external environment through the secure network connection, the one or more non-transitory computer-readable media store further instructions that, when executed, cause the computing system to perform operations comprising:

encapsulating the communication in accordance with the determined routing; and routing the encapsulated communication to the external environment via the secure network connection.

* * * * *